United States Patent
Inaoka et al.

(10) Patent No.: US 9,187,143 B2
(45) Date of Patent: Nov. 17, 2015

(54) EVAPORATED FUEL CONTROL DEVICE FOR VEHICLES THAT ARE STRADDLED

(75) Inventors: Hiroshi Inaoka, Kumagaya (JP); Kazuo Fujihara, Hiki-gun (JP); Shuji Hirayama, Asaka (JP); Takeo Igari, Niiza (JP); Toshinao Takigawa, Niiza (JP)

(73) Assignee: HONDA MOTOR CO., LTD., Tokyo (JP)

(*) Notice: Subject to any disclaimer, the term of this patent is extended or adjusted under 35 U.S.C. 154(b) by 561 days.

(21) Appl. No.: 13/520,793

(22) PCT Filed: Jan. 8, 2010

(86) PCT No.: PCT/JP2010/000083
§ 371 (c)(1),
(2), (4) Date: Dec. 3, 2012

(87) PCT Pub. No.: WO2011/083514
PCT Pub. Date: Jul. 14, 2011

(65) Prior Publication Data
US 2013/0061950 A1    Mar. 14, 2013

(51) Int. Cl.
*B62K 11/00* (2006.01)
*B62J 37/00* (2006.01)
*B62J 35/00* (2006.01)
*F02M 25/08* (2006.01)

(52) U.S. Cl.
CPC *B62J 37/00* (2013.01); *B62J 35/00* (2013.01); *F02M 25/089* (2013.01); *B62K 2202/00* (2013.01); *Y10T 137/6881* (2015.04)

(58) Field of Classification Search
CPC ............ F02M 25/0836; F02M 25/089; F02M 2025/0863; B62K 11/00; B62K 2202/00
USPC .................. 123/518, 519; 180/219, 227, 230; 280/835
See application file for complete search history.

(56) References Cited

U.S. PATENT DOCUMENTS 4,964,483 A * 10/1990 Yokoyama et al. ............ 180/219
8,276,944 B2 * 10/2012 Inaoka .......................... 280/835
(Continued)

FOREIGN PATENT DOCUMENTS

EP    2505819    10/2012
JP    49-88172 U    11/1972
(Continued)

OTHER PUBLICATIONS (English Machine Translation of JP2002-274467, cited on Mar. 24, 2014 IDS).*
(Continued)

*Primary Examiner* — Kevin Hurley
*Assistant Examiner* — Marc A Scharich
(74) *Attorney, Agent, or Firm* — Mori & Ward, LLP

(57) ABSTRACT

There is provided a vaporized fuel control device for a straddle type vehicle that can prevent a situation that liquid fuel in a fuel tank flows into an engine and a situation that oil in the engine flows into the fuel tank while adapting the vaporized fuel control device to the layout of the straddle vehicle. A vaporized fuel passage 110 is disposed so as to have an uppermost portion X at some position thereof between the fuel tank 35 and the engine E, and the uppermost portion X is disposed at a higher position than the fuel upper limit level of the fuel tank 35, the oil upper limit level in the engine E and a footrest portion 44.

7 Claims, 11 Drawing Sheets

(56) References Cited

U.S. PATENT DOCUMENTS

| | | | | |
|---|---|---|---|---|
| 8,327,964 B2* | 12/2012 | Inaoka et al. | ............... | 180/219 |
| 2003/0111283 A1* | 6/2003 | Hakamata et al. | ............ | 180/219 |
| 2010/0163328 A1* | 7/2010 | Hasegawa | .................... | 180/219 |
| 2012/0312619 A1* | 12/2012 | Inaoka et al. | ............... | 180/219 |

FOREIGN PATENT DOCUMENTS

| | | | |
|---|---|---|---|
| JP | 10-324281 | | 12/1998 |
| JP | 2002-274467 | | 9/2002 |
| JP | 2003-246287 | | 9/2003 |
| JP | 200755542 | * | 3/2007 |

OTHER PUBLICATIONS (English Machine Translation of JP2003-246287, cited on Mar. 24, 2014 IDS).*

(English Machine Translation of JP2007-55542, translated on Dec. 10, 2014).*

Extended European Search Report for corresponding EP Application No. 10842038.1-1606, Jan. 23, 2014.

International Search Report for corresponding International Application No. PCT/JP2010/000083, Apr. 20, 2010.

Written Opinion for corresponding International Application No. PCT/JP2010/000083, Apr. 20, 2010.

International Preliminary Report on Patentability with Translation of Written Opinion of the International Searching Authority for corresponding International Application No. PCT/JP2010/000083, Aug. 16, 2012.

European Office Action for corresponding EP Application No. 10842038.1-1606, Oct. 1, 2014.

* cited by examiner (A)

(B)

EVAPORATED FUEL CONTROL DEVICE FOR VEHICLES THAT ARE STRADDLED

TECHNICAL FIELD

The present invention relates to an evaporated fuel control device for a straddle type vehicle.

BACKGROUND ART

There is disclosed a two-wheeled motor vehicle in which a canister for temporarily adsorbing evaporated fuel in a fuel tank is mounted and the evaporated fuel is supplied from the canister to an engine intake system (see Patent Document 1, for example). When a canister is mounted in a straddle type vehicle such as a two-wheeled motor vehicle or the like, the design of the vehicle body is restricted to secure the mount space of the canister and also the vehicle body must be large in size.

A method of introducing evaporated fuel in a fuel tank into a crank chamber after the evaporated fuel is passed through oil in an oil pan in the crank chamber and introducing the evaporated fuel to an engine intake system together with blow-by gas under operation of an engine is disclosed as a method of using no canister (see Patent Document 2, for example).

PRIOR ART DOCUMENTS

Patent Document 1: JP-A-10-324281
Patent Document 2: JP-UM-A-49-88172

SUMMARY OF THE INVENTION

Problem to be Solved by the Invention

In the construction of the cited Document 2, it is required to provide an evaporated fuel passage between the fuel tank and the engine, and when the method of the cited Document 2 is applied to a straddle type vehicle, various problems occur to fit the method to the existing part arrangement and usability of the straddle type vehicle.

For example, with respect to a straddle type vehicle in which an engine is disposed below a seat and a fuel tank is disposed below a footrest portion at the front side of the engine, when the engine and the fuel tank are connected to each other through an evaporated fuel passage at the shortest distance, there occurs a risk that liquid fuel in the tank would flow into the engine or oil in the engine would flow into the fuel tank if the vehicle swings. When the fuel tank is located at a high position to avoid this risk, the position of the footrest portion is also high and this affects driver's comfortableness in ride.

The present invention has been implemented in view of the foregoing situation, and has an object to provide an evaporated fuel control device for a straddle type vehicle that can prevent liquid fuel in a fuel tank from flowing into an engine and also prevent oil in the engine from flowing into the fuel tank while the evaporated fuel control device is fit to the layout of the straddle type vehicle.

Means of Solving the Problem

In order to attain the above object, according to the present invention, a vaporized fuel control device for a straddle type vehicle having a seat on which a driver sits, an engine disposed below the seat, a footrest portion which is disposed in front of the engine and on which the driver puts driver's feet, a fuel tank disposed below the footrest portion, and a vaporized fuel passage that is connected to the fuel tank at one end thereof and connected to the engine at the other end thereof to discharge vaporized fuel in the fuel tank into oil in the engine, is characterized in that the vaporized fuel passage is disposed so as to have an uppermost portion at some position thereof between the fuel tank and the engine, and the uppermost portion is disposed at a position higher than a fuel upper limit level of the fuel tank, an oil upper limit level in the engine and the footrest portion.

According to this construction, the vaporized fuel passage is disposed so as to have the uppermost portion at some position between the fuel tank and the engine, and the uppermost portion is disposed at a position higher than the fuel upper limit level of the fuel tank, the oil upper limit level in the engine and the footrest portion. Therefore, the situation that the liquid fuel in the fuel tank flows into the engine and the situation that the oil in the engine flows into the fuel tank can be prevented while the vaporized fuel passage is adapted to the layout of the straddle type vehicle. In this case, since the uppermost portion of the vaporized fuel passage is set to a position higher than the footrest portion, a situation that fuel or oil flows in can be effectively prevented with securing rider's comfortability by keeping the footrest portion at a low position.

In the above construction, the uppermost portion may be disposed at the rear side of a vehicle body as compared with the footrest portion. According to this construction, the vaporized fuel passage of the mountain type pipe can be formed by using the space vacant behind the footrest portion with keeping the footrest portion at a low position.

In the above construction, the vaporized fuel passage may be disposed along the upper surface of the engine. According to this construction, when the vaporized fuel is condensed in the vaporized fuel passage, the condensed fuel can be positively vaporized by using heat of the engine.

In the above construction, the vaporized fuel passage may be disposed so as to have an S-shaped pipe portion bent in S-shape in a right and left vehicle width direction behind the footrest portion in the neighborhood of the fuel tank and at a position lower than the uppermost portion. According to this construction, the S-shaped pipe portion can be disposed by using the space behind the footrest portion with keeping the footrest portion at a low position. The S-shaped pipe portion makes it hard for the liquid fuel to flow to the uppermost portion so that the gas-liquid separation structure at the fuel tank side can be simplified.

Furthermore, the above construction may further comprise a first check valve for stopping flow from the engine to the fuel tank at some position of the vaporized fuel passage, wherein the first check valve is disposed at the rear side of the vehicle body as compared with the footrest portion. According to this construction, the situation that the oil in the engine flows into the fuel tank can be surely prevented, and also the space behind the footrest portion can be used with keeping the footrest portion at a low position.

Still furthermore, in the above construction, the vaporized fuel control device may further comprise a first check valve for stopping flow from the engine to the fuel tank at some position of the vaporized fuel passage, wherein the first check valve is disposed in the vaporized fuel passage to be nearer to the engine side than the uppermost portion. According to this construction, the liquid stopped by the first check valve is allowed to flow to the engine side.

In the above construction, the straddle type vehicle may have an air supply passage for supplying air into the fuel tank, and the air supply passage may have a second check valve for stopping flow from the fuel tank to the atmosphere side. According to this construction, the internal pressure of the fuel tank can be prevented from being set to excessively negative pressure.

Furthermore, in the above construction, the air supply passage may be connected to some position of the vaporized fuel passage. According to this construction, apart of the vaporized fuel passage can be shared with the air supply passage.

In this case, the air supply passage may be connected to the vaporized fuel passage in the neighborhood of the uppermost portion of the vaporized fuel passage. According to this construction, oil or fuel can be suppressed from being stocked at the connection portion.

In the above construction, the air supply passage may be laid to be upwardly sloped from a connection portion connected to the vaporized fuel passage, and the second check valve may be disposed in the upwardly sloped pipe. According to this construction, even when the fuel infiltrates to the vaporized fuel passage side, the fuel can be returned to the vaporized fuel passage side by the second check valve of the air supply passage.

In the above construction, the straddle type vehicle may have a leg shield in front of the footrest portion, and the air supply passage may be disposed in the leg shield. According to this construction, the air supply passage can be disposed by using the space in the leg shield.

Effect of the Invention

According to the present invention, in a straddle type vehicle having a seat on which a driver sits, an engine disposed below the seat, a footrest portion which is disposed in front of the engine ad on which the driver puts his/her feet, a fuel tank disposed below the footrest portion, a vaporized fuel passage is disposed so as to have an uppermost portion at some position thereof between the fuel tank and the engine, and the uppermost portion is disposed at a position higher than a fuel upper limit level of the fuel tank, an oil upper limit level in the engine and the footrest portion. Therefore, the situation that the liquid fuel in the fuel tank flows into the engine and the situation that the oil in the engine flows into the fuel tank can be prevented while the vaporized fuel passage is adapted to the layout of the straddle type vehicle.

Furthermore, the uppermost portion is disposed at the rear side of the vehicle body as compared with the footrest portion, whereby the vaporized fuel passage of the mountain type pipe can be formed by using the space vacant behind the footrest portion with keeping the footrest portion at a low position.

The vaporized fuel passage is disposed along the upper surface of the engine, whereby when the vaporized fuel is condensed in the vaporized fuel passage, the condensed fuel can be positively vaporized by using heat of the engine.

Furthermore, the vaporized fuel passage is disposed so as to have an S-shaped pipe portion bent in S-shape in a right and left vehicle width direction behind the footrest portion in the neighborhood of the fuel tank and at a position lower than the uppermost portion, whereby the S-shaped pipe portion can be disposed by using the space behind the footrest portion with keeping the footrest portion at a low position, and the S-shaped pipe portion makes it hard for the liquid fuel to flow to the uppermost portion so that the gas-liquid separation structure at the fuel tank side can be simplified.

Furthermore, a first check valve for stopping flow from the engine to the fuel tank is provided at some position of the vaporized fuel passage, and the first check valve is disposed at the rear side of the vehicle body as compared with the footrest portion, whereby the situation that the oil in the engine flows into the fuel tank can be surely prevented, and also the space behind the footrest portion can be used with keeping the footrest portion at a low position.

Still furthermore, a first check valve for stopping flow from the engine to the fuel tank is provided at some position of the vaporized fuel passage, and the first check valve is disposed in the vaporized fuel passage to be nearer to the engine side than the uppermost portion, whereby the liquid stopped by the first check valve is allowed to flow to the engine side.

The straddle type vehicle has an air supply passage for supplying air into the fuel tank, and the air supply passage has a second check valve for stopping flow from the fuel tank to the atmosphere side, whereby the internal pressure of the fuel tank can be prevented from being set to excessively negative pressure.

Furthermore, the air supply passage is connected to some position of the vaporized fuel passage, whereby a part of the vaporized fuel passage can be shared with the air supply passage. In this case, the air supply passage is connected to the vaporized fuel passage in the neighborhood of the uppermost portion of the vaporized fuel passage, whereby oil or fuel can be suppressed from being stocked at the connection portion.

Still furthermore, the air supply passage is laid to be upwardly sloped from a connection portion connected to the vaporized fuel passage, and the second check valve is disposed in the upwardly sloped pipe, whereby even when the fuel infiltrates to the vaporized fuel passage side, the fuel can be returned to the vaporized fuel passage side by the second check valve of the air supply passage.

Still furthermore, the straddle type vehicle has a leg shield in front of the footrest portion, and the air supply passage is disposed in the leg shield, whereby the air supply passage can be disposed by using the space in the leg shield.

MODES FOR CARRYING OUT THE INVENTION

An embodiment according to the present invention will be hereinafter described with reference to the drawings. In the following description, the front-and-rear and right-and-left directions and the up-and-down direction are defined as directions in which the driver of a vehicle views.

<First Embodiment>

Figure 1:
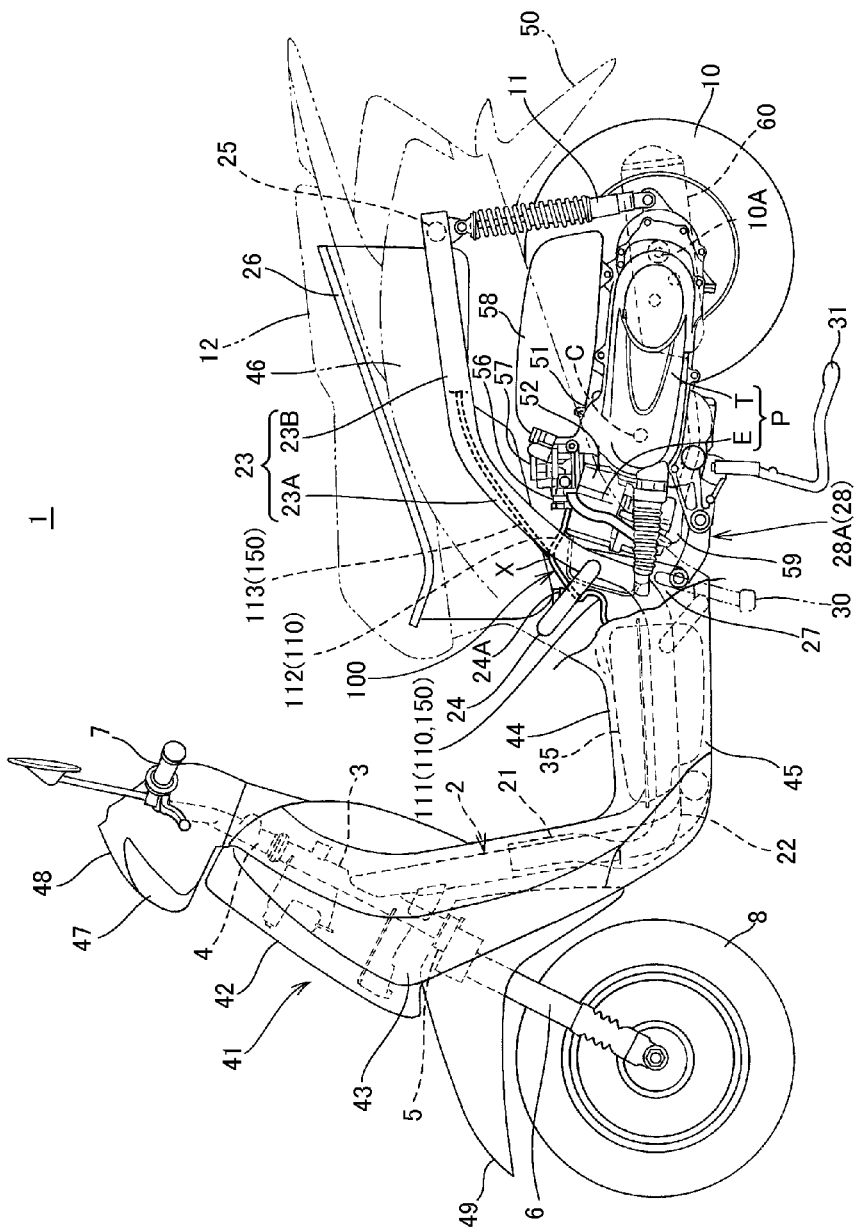
FIG. 1 is a side view showing a two-wheeled motor vehicle having an evaporated fuel control device mounted therein according to a first embodiment of the present invention.
Figure 2:
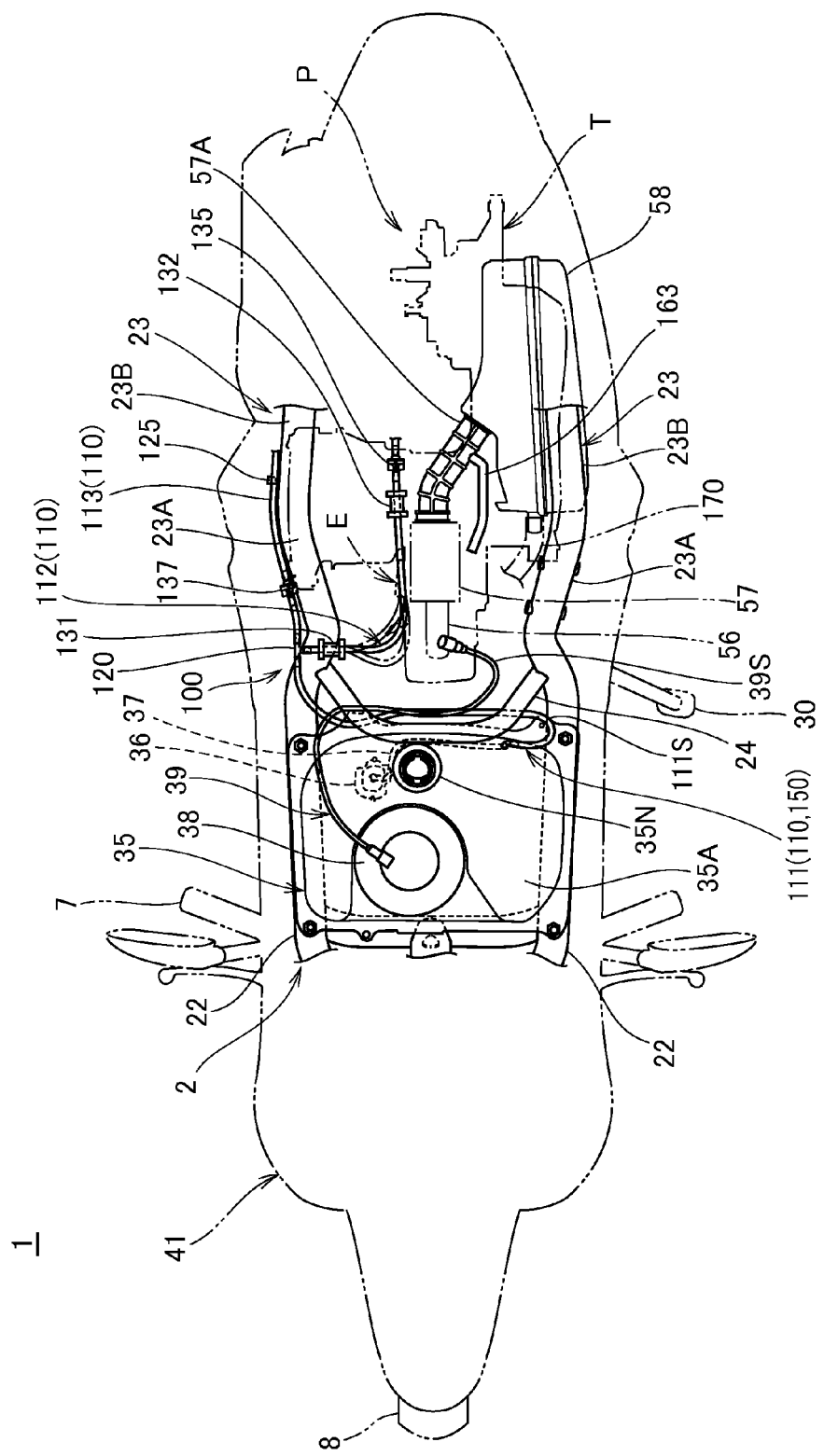
FIG. 2 is a top view of the two-wheeled motor vehicle.

FIG. 1 is a side view showing a two-wheeled motor vehicle in which an evaporated fuel control device according to a first embodiment of the present invention is mounted, and FIG. 2 is a top view showing the two-wheeled motor vehicle.

This two-wheeled motor vehicle 1 is a scooter type straddle type vehicle in which a power unit P is supported on a vehicle body frame 2 so as to be swingable in the up-and-down direction, and has a foot straddling space which is designed in U-shape in side view and disposed ahead of a seat 12 on which a driver sits.

This two-wheeled motor vehicle 1 has a vehicle body frame 2, a steering stem 4 which is supported on a head pipe of the vehicle body 2 so as to be freely rotatable and constitutes a part of a steering system, a pair of right and left front forks 6 which are secured to a bottom bridge 5 provided to the lower end of the steering stem 4, a steering handle 7 joined to the upper end of the steering stem 4, a front wheel 8 which is freely rotatably supported by the front fork 6, a swing type power unit P which is supported by the rear portion of the vehicle body frame 2 so as to be freely swingable in the up-and-down direction, a rear wheel 10 which is freely rotatably supported by the rear end portion of the power unit P, a rear cushion 11 disposed between the power unit P and the vehicle body frame 2, and a seat 12 supported substantially at the center upper portion of the vehicle body frame 2.

The vehicle body frame 2 has a single down frame 21 extending from the head pipe 3 rearwards and downward along the center in the vehicle width direction, a pair of right and left lower frames 22 which are fixed to both the sides of the lower portion of the down frame 21 at the front ends thereof and extend rearwards, and a pair of right and left rear frames 23 which are integrally continuous with the rear ends of the lower frames 22. Each of the frames 21 to 23 is formed of a metal pipe.

The rear frame 23 has a slant portion 23A extending from the rear end of the lower frame 22 rearwards and upwards and a horizontal portion 23B extending from the rear end of the slant portion 23A horizontally and rearwards which are provided integrally with each other. A U-shaped first cross member 24 which protrudes ahead in top view is bridged between the front portions of the right and left rear frames (the right and left slant portions 23A), and a second cross member 25 extending linearly in the vehicle width direction is bridged between the rear portions of the right and left rear frames 23 (the right and left horizontal portions 23B).

As shown in FIG. 2, the first cross member 24 is curved convexly in the frontward direction in plan view. Therefore, A mount space for the power unit P can be broadly secured at the rear side of the first cross member 24 while the rigidity of the front portions of the rear frames 23 is enhanced. Furthermore, the front side of these parts can be guarded by the first cross member 24. In FIG. 2, reference numeral 24A represent a pair of right and left support portions which are provided to the first cross member 24 and support a storage box 26.

A pair of right and left brackets 27 are provided to the continuing portions of the right and left lower frames 22 and the rear frames 23, and the power unit P is supported on the brackets 27 so as to be freely swingable in the up-and-down direction through a link mechanism 28.

A side stand 30 (represented by a two-dotted chain line in FIG. 1) is secured to the left-side bracket 27 so as to be freely turnable, and the vehicle can be parked by the side stand 30 with being postured to be tilted to the left side. A center stand 31 is secured to the front lower portion of the power unit P between the link mechanism 28 and the rear wheel 10, and the vehicle can be parked by the center stand 31 with being postured to be vertical to the ground surface.

FIG. 1 shows a state that both the stands 30 and 31 are turned down to the parking position. Both the stands 30 and 31 are designed in a stand-like shape so that the stands 30 and 31 are flipped up rearwards in a retraction position and also are erected to be tilted to the front lower side in a parking position.

A fuel tank 35 is disposed between the right and left lower frames 22, and a long storage box 26 is disposed in the front-and-rear direction between the rear frames 23 over the space from the first cross member 24 to the second cross member 25. When the fuel tank 35 is disposed between the right and left lower frames 22, the fuel tank 35 is located ahead of the power unit P below the seat 12, and thus the center of gravity of the vehicle body can be further lowered, and the mass can be further concentrated. In addition, the storage box 26 can be further increased in capacity because the fuel tank 35 does not exist at the rear frame 23 side.

The seat 12 is formed as an integral type seat which is long in the front-and-rear direction so that a driver and a fellow passenger can sit to be spaced from each other in the front-and-rear direction, and secured through a hinge mechanism (not shown) so as to open/close the upper opening of the storage box 26.

This two-wheeled motor vehicle 1 has a vehicle body cover 41 which covers the vehicle body and is formed of synthetic resin. When roughly classified, the vehicle body cover 41 has a front cover 42 covering a front portion of the vehicle body (the head pipe 3, etc.), a leg shield 43 which is joined to the back surface of the front cover 42 so as to sandwich the head pipe 3 therebetween and covers the front side of the driver's feet, a footrest portion (also called as a step floor) which is located at the lower portion of the vehicle body (above the fuel tank 35, etc.) and on which the driver's feet are put, an under cover 45 covering the side and lower side of the lower portion of the vehicle body (the fuel tank 35, etc.), and a rear cover 46 covering both the sides of the rear portion of the vehicle body.

A handle cover 48 which covers the surrounding parts of the handle 7 and to which a head lamp 47 is secured is fixed to the handle 7. A front fender 49 covering the front wheel 8 is fixed to the front forks 6, and a rear fender 50 covering the rear wheel 10 is fixed to the rear cover 46.

Figure 3:
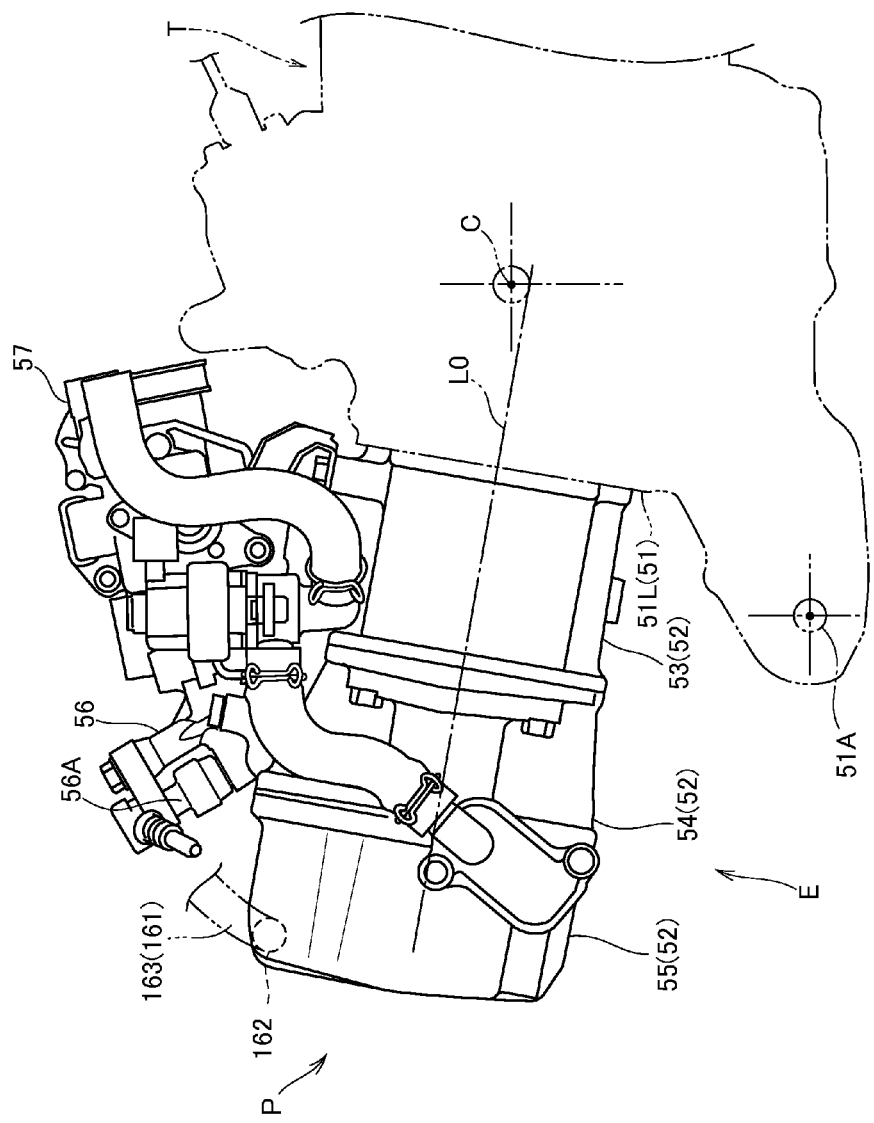
FIG. 3 is a side view of a power unit.

FIG. 3 is a left side view showing the power unit P.

The power unit P is constructed by a water-cooled type single cylinder 4-cycle engine E, and a power transmission device T for transmitting the output power of the engine E to the rear wheel 10. The power unit P is supported so that the engine E is swingable around an axial line parallel to the rotational axial line of the rear wheel 10 through a link member (also called as an engine hanger) 28A, the lower end of the rear cushion 11 is joined to the rear portion of the power transmission device T, and the upper end of the rear cushion 11 is joined to the rear portion of the rear frame 23. That is, the power unit P also functions as a swing arm which supports the rear wheel 10 so that the rear wheel 10 is freely swingable in the up-and-down direction.

The engine E has a crankcase 51 having a right-and-left dual-partitioning structure comprising a right crankcase 51R and a left crankcase 51L for supporting a crankshaft C in parallel to the rotational axial line of the rear wheel 10 (the axial line of the rear wheel shaft 10A) so that the crankshaft C is freely rotatable, and a cylinder portion 52 which is joined to the front portion of the crankcase 51 and whose cylinder axial line is frontward tilted to be substantially horizontal. The cylinder portion 52 has a cylinder block 53, a cylinder head 54 joined to the front surface of the cylinder block 53, and a head cover 55 joined to the front end of the cylinder head 54. In FIG. 3, reference character L0 represents a cylinder bore center, and reference numeral 51A represents a boss to which a link member (engine hanger link) 28A is joined (a boss of the engine hanger link). As shown in FIG. 3, this engine E is designed to have an offset crank layout in which the cylinder bore center L0 is offset downwardly with respect to the crankshaft C.

A throttle body 57 is joined to the upper surface of the cylinder head 54 as a front upper portion of the engine E through an inlet pipe 56 on which an injector 56A is mounted, and an air cleaner unit 58 (see FIG. 1) is connected to the throttle body 57 through a connecting tube 57A. The air cleaner unit 58 is secured to the upper portion of a power unit P at the left side of the rear wheel 10, and designed in a box-shape so as to extend in the front-and-rear direction at the left side of the rear wheel 10.

An exhaust pipe 59 is connected to the lower surface of the cylinder head 54 as the front lower portion of the engine E. The exhaust pipe 59 extends to the right side of the rear wheel 10 while extending to the rear side of the vehicle below the engine E, and a muffler 60 is connected to the rear end of the exhaust pipe 59. That is, an engine intake system of this vehicle 1 is disposed by using a space above the engine E (above the power unit P), and an engine exhaust system is disposed by using a space below the engine E (below the power unit P) and the right side of the rear wheel 10.

A power transmission device T has a V-belt type stepless transmission mechanism, and it transmits the rotation of the crankshaft C to the rear wheel 10 at a continuously variable transmission gear ratio to rotate the rear wheel 10. The power transmission device T is formed integrally with the engine E so that the power unit P is miniaturized.

This vehicle 1 is designed to have such a part layout that the engine E is disposed below the seat 12, and the fuel tank 35 is disposed below the footrest portion 44 at the front side of the engine E. Therefore, a space surrounded by the fuel tank 35, the power unit P and the storage box 26 is formed at the rear side of the footrest portion 44.

In this construction, a vaporized fuel control device 100 for preventing vaporized fuel occurring in the fuel tank 35 from being discharged to the atmosphere is disposed by using this space at the rear side of the footrest portion 44. The vaporized fuel control device 100 will be described hereunder in detail.

Figure 4:
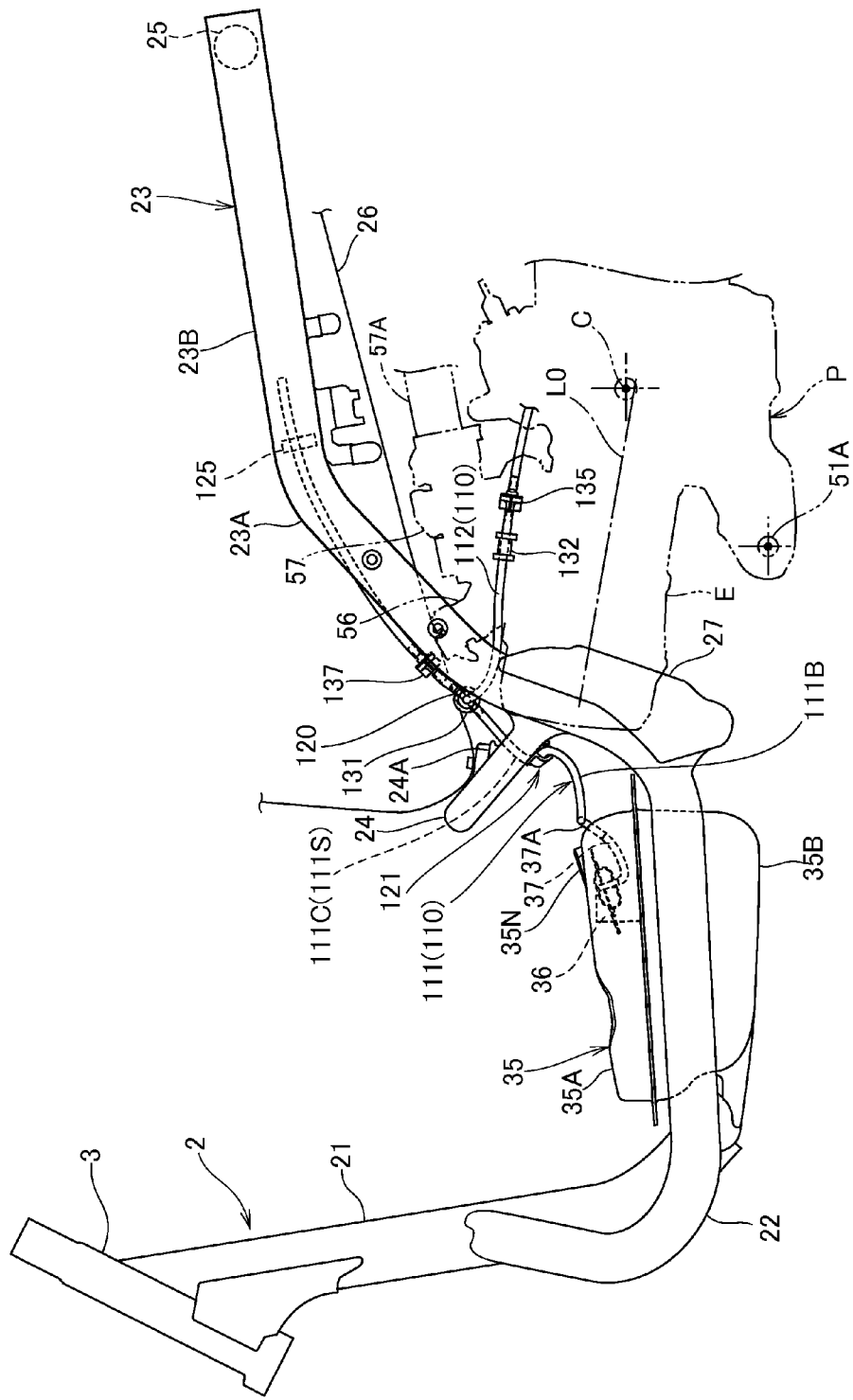
FIG. 4 is a view showing the evaporated fuel control device together with the surrounding construction thereof when they are viewed from the side of the vehicle body.
Figure 5:
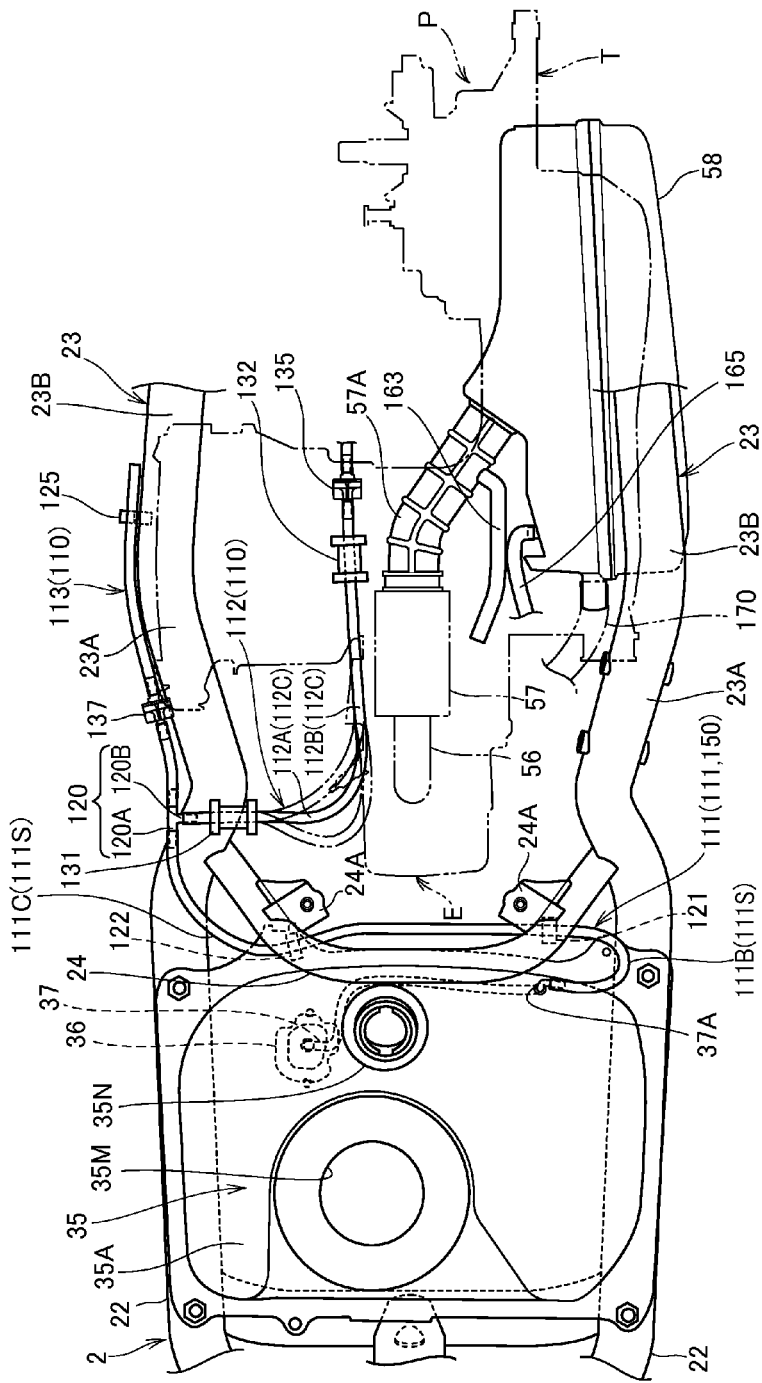
FIG. 5 is a view showing the evaporated fuel control device together with the surrounding construction thereof when they are viewed from the upper side of the vehicle body.

FIG. 4 is a diagram showing the vaporized fuel control device 100 together with the surrounding construction when viewed from the vehicle body side, and FIG. 5 is a top view of the vehicle body.

The fuel tank 35 is designed in a vertically two-divisional structure and comprises an upper case 35A and a lower case 35B. A pump mount portion 35M on which the fuel pump 38 is mounted and a fuel filler opening 35N having a smaller diameter than the pump mount portion 35M are provided to the upper case 35A so as to be spaced from each other in the front-and-rear direction, and a gas-liquid separator 36 is secured to the back surface (lower surface) of the upper case 35A in a side space which is vacant at the side (the right side in this construction) of the small-diameter fuel filler opening 35N.

Liquid fuel is stocked in the fuel tank 35. When the liquid fuel is warmed by ambient temperature or the like, a part of the liquid fuel is vaporized, and the vaporized fuel is trapped in the upper space in the tank 35. The gas-liquid separator 36 is disposed in the upper space in the tank 35, so that the vaporized fuel can be smoothly introduced into the separator 36, subjected to gas-liquid separation in the gas-liquid separator 36 and made to flow to a gas outlet.

One end of an in-tank pipe 37 which is formed of metal or resin (containing rubber) and forms a vaporized fuel passage is joined to the gas outlet of the gas-liquid separator 36. The in-tank pipe 37 extends to the opposite side (left side) to the gas-liquid separator 36 along the rear wall of the upper case 35A with avoiding the fuel filler opening 35N, penetrates through the upper plate of the upper case 35A at one end side (left side) in the vehicle width direction of the upper case 35A, and projects upwardly. Accordingly, a vaporized fuel outlet portion 37A for discharging vaporized fuel in the tank 35 is provided at one end side (the left in this construction) in the vehicle width direction of the rear portion of the fuel tank 35.

One end of an out-of-tank pipe 110 constituting a vaporized fuel passage outside the tank 35 is joined to the vaporized fuel outlet portion 37A of the fuel tank 35. The out-of-tank pipe 110 has a first pipe 111 joined to the vaporized fuel outlet portion 37A, and a second pipe 112 and a third pipe 113 which are joined to the rear end of the first pipe 111 through a joint part 120. The rear end of the second pipe 112 is joined to the engine E, and the rear end of the third pipe 113 is opened. These pipes 111 to 113 are pipes which have flexibility such as rubber hoses or the like, and through which no fuel is permeable. Since these pipes 111 to 113 are covered by the vehicle body cover 41, they are not soused with rain water or the like, and rain water, dust, etc. do not invade from the rear end of the third pipe 113.

As shown in FIGS. 4 and 5, the first pipe 111 is supported along the vehicle body frame 2 by a pair of clamp members 121 and 122 provided at the right and left sides of the first cross member 24.

Here, the clamp members 121 and 122 are fixed to the vehicle body frame 2 by welding or a fastening member such as a screw or the like, and serve as pipe holding parts through which the out-of-tank pipe 110 is held on the vehicle body frame.

As shown in FIG. 4, in side view, the first pipe 111 extends upwardly from the vaporized fuel outlet portion 37A of the fuel tank 35 to the first cross member 24, and supported to the first cross member 24 through the clamp member 121 provided at one end side (left side) in the vehicle width direction of the lower surface of the first cross member 24.

Furthermore, as shown in FIG. 5, in plan view, the first pipe 111 is designed as a U-shaped bent portion 111B which is convex to the outside (left side) in the vehicle width direction from the vaporized fuel outlet port 37A of the fuel tank 35, and after this bent portion 111B is formed, the first pipe 111 is supported by the clamp member 121.

As shown in FIGS. 4 and 5, the clamp member 121 supports the first pipe 111 along the vehicle width direction, whereby the first pipe 111 is held by the clamp member 121 while it is kept as the U-shaped bent portion 111B which is convexed outwardly in the vehicle width direction.

The first pipe 111 further extends to a direction determined by the clamp member 121, that is, inwardly (to the right side)

in the vehicle body direction, and supported by the clamp member 122 provided at the right side on the lower surface of the first cross member 24.

In this case, the first pipe 111 does not extend linearly in the vehicle width direction, but it is laid on so as to form a curved portion 111C moving to the front and upper sides of the vehicle body from the support position of one clamp member 121 as shown in FIGS. 5 and 4. The first pipe 111 is supported by the other clamp member 122 so as to hold the curved portion 111C, laid on upward and rearward to the outside of the rear frame 23 and further joined to a joint part 120 at the upper side of the first cross member 24 and at some position of a slant portion 23A of the rear frame 23.

Furthermore, the first pipe 111 serves as a down-pipe from the clamp member 122 at the right side of the vehicle body to the clamp member 121 at the left side of the vehicle body. Therefore, even when the vehicle is parked by the side stand 30, the down-pipe concerned serves as neither a horizontal pipe nor an up-pipe, and it is kept as the down-pipe.

That is, as shown in FIG. 5, the first pipe 111 has an S-shaped pipe portion 111S which comprises the U-shaped bent portion 111B and the curved portion 111C and is bent in S-shape between the right and left sides in the vehicle width direction. The first pipe 111 is joined to the joint part 120 at a position higher than the S-shaped pipe portion 111S. As described above, the S-shaped pipe portion 111S is provide between the fuel tank 35 and the joint part 120. Therefore, even when the vehicle 1 is tilted in the vehicle width direction and fuel in the fuel tank 35 flows into the first pipe 111, the fuel hardly passes through the S-shaped pipe portion 111S, and there can be avoided a situation that the fuel flows to the joint part 120.

A substantially T-shaped 3-way joint is used as the joint part 120, and it is provided integrally with a first pipe portion 120A which extends in the front-and-rear direction of the vehicle body and is connectable to pipes at both the ends thereof, and a second pipe portion 120B which extends in the vehicle width direction from the first pipe portion 120A and is connectable to a pipe at the tip thereof. The rear end of the first pipe 111 is joined to the front end of the first pipe portion 120A, and the front end of a third pipe 113 is joined to the rear end of the first pipe portion 120A. The tip of the second pipe 112 is joined to the tip of the second pipe portion 120B.

The second pipe 112 is supported by a first grommet 131 secured to the rear frame 23 along which the first pipe 111 is laid on, and a second grommet 132 secure to the upper surface of the engine E (the upper surface of the power unit P).

Here, both the grommets 131 and 132 are formed of cylindrical elastic members each of which has an insertion hole having a predetermined length through which the second pipe 112 is insertable. The second pipe 112 is inserted through the insertion holes, whereby the second pipe 112 is elastically held without applying any fastening force to the second pipe 112 while the second pipe 112 is oriented along the insertion holes. Each of the grommets 131 and 132 of this construction has flange portions at both the ends thereof, and is designed so that the gap between the flange portions is fixed to the rear frame 23 or the engine E through a predetermined member, whereby the grommets 131 and 132 can be fixed at a desired position with high precision. The shapes of the grommets 131, 132 and the fixing method for them are not limited to the above construction, and publicly known methods may be broadly applied.

The first grommet 131 is secured to the upper surface of the slant portion 23A of the rear frame 23 at the upper position of the first cross member 24, and holds the neighborhood of the tip portion of the second pipe 112 in a direction along the vehicle width direction (toward the upper surface of the power unit P). In this case, the tip portion of the second pipe 112 is joined to the joint part 120. Therefore, the neighborhood of the tip portion of the second pipe 112 is held by the first grommet 131, whereby the joint part 120 can be also held by the first grommet 131. Therefore, in this construction, a holding part which is exclusively used for the joint part 120 is unnecessary.

As shown in FIG. 4, the second grommet 132 is located at a position lower than the first grommet 131, and secured to the upper surface of the engine E (the upper surface of the power unit P) at a position which is far away from the first grommet 131 in the vehicle width direction as shown in FIG. 5, whereby the neighborhood of the rear end portion of the second pipe 112 is held in a direction along the front-and-rear direction of the vehicle body.

Here, as shown in FIG. 5, the second grommet 132 is provided at the joint part 120 side (the right side of the vehicle body) with respect to the engine intake system, so that the second pipe 112 can be disposed in a space vacant at a side (the right side in this construction) of the throttle body 57, the connecting tube 57A, etc. which constitute the engine intake system.

In this construction, the second pipe 112 constituting the vaporized fuel passage is disposed at one of the right and left sides (the right side in this construction) with respect to the throttle body 57 and the connecting tube 57A, and the area cleaner unit 58 is disposed at the other side so as to be offset from the second pipe 112. Therefore, the second pipe 112 and the air cleaner unit 58 are disposed to be allocated to the right and left sides, respectively.

Furthermore, as shown in FIG. 5, the first grommet 131 and the second grommet 132 are disposed to be spaced from each other in the front-and-rear direction and the right-and-left direction, so that the second pipe 112 has a bent portion 112C comprising a vehicle-width direction extension portion 112A extending along the first grommet 131 and a front-and-rear direction extension portion 112B extending along the second grommet 132.

According to this construction, the front-and-rear direction extension portion 112B of the second pipe 112 can be made to be easily swung vertically interlockingly with the swing motion of the engine E (the swing motion of the power unit P) while the axial line of the vehicle width direction extension portion 112A of the second pipe 112 is set as a pivot. The movement state of the second pipe 112 is represented by a two-dotted chain line in FIG. 5.

Accordingly, the second pipe 112 can be made to smoothly follow the swing motion of the engine E without greatly moving the second pipe 112, and the displacement acting on the second pipe 112 by the swing motion of the engine E (the swing motion of the power unit P) can be absorbed by the bent portion 112C.

Furthermore, since the second grommet 132 is provided at a lower position as compared with the first grommet 131 as shown in FIG. 4, the second pipe 112 is laid on so as to slope rearwards and downwards in side view. This slope extends along the upper surface of the engine E (the upper surface of the power unit P) (downslope), and most of the extension portion 112B in the front-and-rear direction of the second pipe 112 is disposed in the neighborhood of the engine E.

The rear end portion of the second pipe 112 is joined to the upper surface of the engine E and intercommunicates with engine oil (hereinafter referred to as oil) stocked in the crankcase 51 of the engine E.

Furthermore, a first check valve 135 for stopping flow of fluid from the engine E to the first pipe 111 side is interposed between the joint position to the engine E and the second grommet 132 in the second pipe 112. Accordingly, flow of vaporized fuel from the inside of the fuel tank 35 into the engine E is allowed, and also flow of oil from the inside of the engine E into the fuel tank 35 is avoidable.

Since the first check valve 135 is provide in the neighborhood of the second grommet 132 supported by the engine E, the first check valve 135 can be held by the second grommet 132, and it is not necessary to provide any support member dedicated to the first check valve 135.

Figure 6:
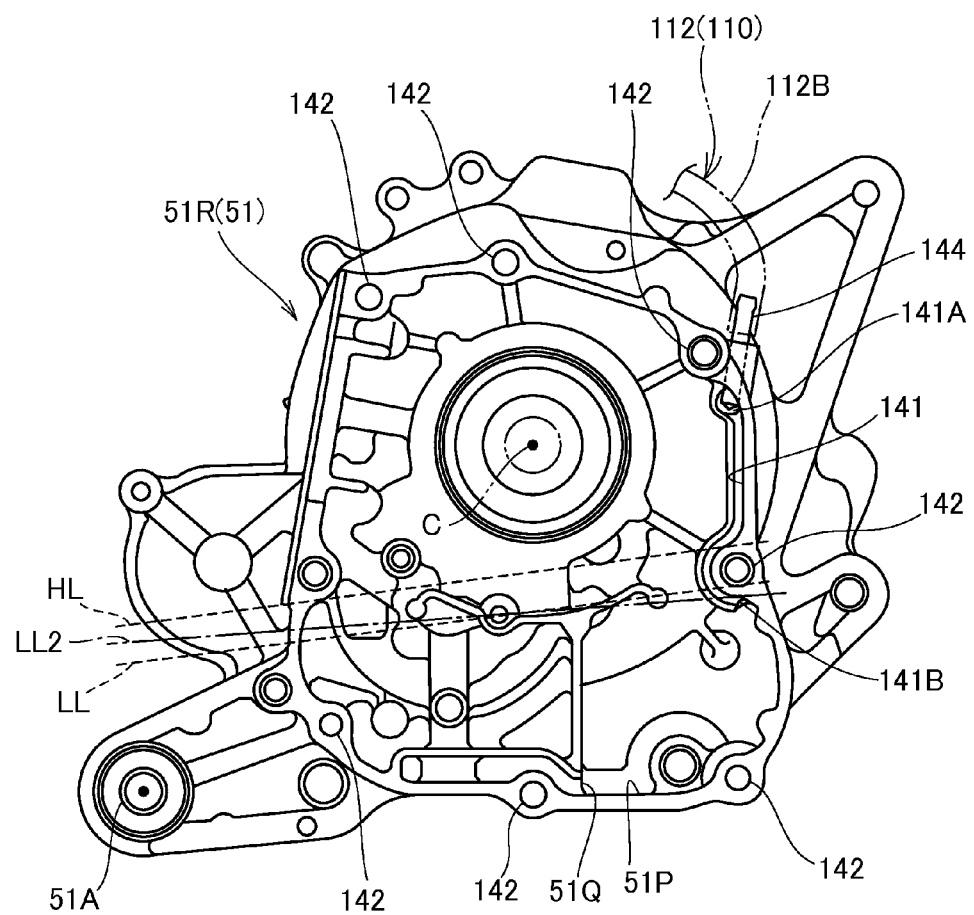
FIG. 6 is a diagram showing a joint portion between an evaporated fuel passage and an engine together with the surrounding construction thereof.

FIG. 6 is a diagram showing the joint portion between the second pipe 112 and the engine E together with the surrounding construction.

In the right crankcase 51R constituting a right half body of the crankcase 51, a penetrating groove 141 which extends in the up-and-down direction behind a crankshaft C and in front of the rear wheel and is opened to the left crankcase 51L side is formed on the mating face to the left crankcase 51L (the inner surface in the vehicle width direction) as shown in FIG. 6, and the open portion is blocked by the mating face of the left crankcase 51L (not shown), thereby forming a vaporized fuel passage extending vertically.

The vaporized fuel passage is provided so as to extend in the up-and-down direction in the rear wall of the crankcase 51 with avoiding joint portions 142 for fastening the crankcases 51 with fastening bolts and so that an upper end opening 141A thereof intercommunicates with a joint 144 in which the second pipe 112 from the fuel tank 35 side is inserted and a lower end opening 141B is opened in oil (engine oil) stocked in the oil pan 51P of the crankcase 51. Accordingly, the vaporized fuel passage (penetrating groove 141) through which the second pipe 112 is made to intercommunicate with the oil is formed at the center in the width direction of the engine E, behind the crankshaft C and in front of the rear wheel 10. In the construction that the vaporized fuel passage is provided at the center in the width direction of the engine E, a situation that oil flows out from the vaporized fuel passage (penetrating groove 141) when the vehicle is tilted to one side in the width direction can be suppressed as compared with a case where the vaporized fuel passage is provided at one side in the width direction of the engine E.

In FIG. 6, reference character HL represents the oil upper limit level of the oil stocked in the oil pan 51 under the state that the vehicle 1 is parked on a horizontal plane, reference character LL represents the oil lower limit level of the oil under the state that the vehicle 1 is parked on the horizontal plane, and reference numeral 51Q represents a suction port of an oil pump.

Furthermore, in FIG. 6, reference character LL2 represents an oil level when the vehicle 1 is forwardly tilted to the parking limit after oil is supplied till the oil lower limit level LL under the state that vehicle 1 is parked on the horizontal plane, and the lower end opening 141B1 of the vaporized fuel passage (penetrating groove 141) is provided at a position which is lower and in the neighborhood of the oil level (the oil level under the parking limit) LL2. Accordingly, the lower end opening 141B can be surely located in the oil without needlessly disposing the lower end opening 141B at the lower side, and vaporized fuel flowing from the vaporized fuel passage (penetrating groove 141) into the engine E can be made to easily blend into the oil.

Here, the oil level (the oil level under the parking limit) LL2 may be set on the assumption that the vehicle is parked on such a downslope surface that the center stand 31 or the side stand 30 under parking is vertical in side view, for example.

Next, the third pipe 113 will be described.

The third pipe 113 is supported by a clamp member 125 provided to the front portion of the horizontal portion 23B of the rear frame 23 so as to extend rearwards and upwards along the surface from the rear end of the first pipe portion 120A of the joint part 120 to the outer surface in the vehicle width direction of the rear frame 23 and so that the rear end thereof extends to the horizontal portion 23B of the rear frame 23.

A second check valve 137 for stopping flow of fluid from the joint part 120 side to the rear end of the second pipe 112 is interposed between the joint part 120 and the clamp member 125, and air out of the vehicle (outdoor air) is allowed to flow through the third pipe 113 into the fuel tank 35, and also discharge of fuel and oil to the outside of the vehicle is avoidable. As shown in the figures, the second check valve 137 is provided in the neighborhood of the first grommet 131 supported by the rear frame 23, so that the second check valve 137 can be also supported by the first grommet 131 and it is not necessary to provide any support member dedicated to the second check valve 137.

Next, the flow of the vaporized fuel by a vaporized fuel control device 100 will be described.

When a part of fuel in the fuel tank 35 is vaporized and the internal pressure of the fuel tank 35 is higher than outdoor air pressure (becomes positive pressure) and also higher than the internal pressure in the crankcase 51 of the engine E, the vaporized fuel passes through the gas-liquid separator 36, flows into the first pipe 111 and then flows through the first pipe 111 into the joint part 120. In this case, the first check valve 135 of the second pipe 112 is set to an open state, and the second check valve 137 of the third pipe 113 is set to a close state, so that the vaporized fuel flowing through the first pipe 111 flows through the joint part 120 into the second pipe 112, and flows into the oil in the engine E. Accordingly, the vaporized fuel can be made to blend into the oil.

When the internal pressure of the fuel tank 35 is less than the outdoor air pressure (becomes negative pressure), the first check valve 135 of the second pipe 112 is set to a close state, and the second check valve 137 of the third pipe 113 is set to an open state. Therefore, outdoor air flows through the third pipe 113, the joint part 120 and the first pipe 111 into the fuel tank 35, whereby the internal pressure of the fuel tank 35 can be adjusted to the atmosphere pressure.

That is, the first pipe 111 and the second pipe 112 forms the vaporized fuel passage, and the first pipe 111 and the third pipe 113 form an air supply passage 150. Here, the out-of-tank pipe 110 formed by the first pipe 111 and the second pipe 112 is the vaporized fuel passage, and thus the vaporized fuel passage will be described with being affixed with reference numeral 110 arbitrarily so that the description thereof is made easily understandable.

In this construction, the first grommet 131 which holds the second pipe 112 is provided at a higher position than the fuel tank 35 and the engine E, and thus some position of the first pipe 111 and the second pipe 112 which constitute the vaporized fuel passage 110 and through which the fuel tank 35 and the engine E are connected to each other is set to the uppermost portion X. Therefore, the first pipe 111 and the second pipe 112 are laid in a mount type pipe layout having the uppermost portion X as the crest in side view. Therefore, the fluid from the fuel tank 35 cannot flow to the engine E side unless it goes over the uppermost portion X. Even when vaporized fuel or liquid fuel flows out from the fuel tank 35, the vaporized fuel having a small density flows to the engine E side, however, the liquid fuel having a large density hardly flows to the engine E side. Likewise, even when oil flows out from the engine E side, the oil hardly flows to the fuel tank 35 side. Accordingly, a situation that the liquid fuel in the fuel tank 35 flows into the engine E and a situation that the oil in the engine E flows into the fuel tank 35 can be suppressed to the minimum level.

Furthermore, the third pipe 113 dedicated to the air supply passage 150 is connected to the fuel tank 35 side as compared with the first check valve 135 in the vaporized fuel passage, and the first check valve 135 provided in the vaporized fuel passage is provided to be shifted to the engine E as compared with the uppermost portion X of the mount type pipe. Accordingly, air can be made to flow into the fuel tank 35 while the third pipe 113, etc. can be easily laid out from the first cross member 24 along the rear frame 23 between the fuel tank 35 and the engine E. Flow-in of oil from the engine E to the second pipe 112 can be quickly prevented by the first check valve 135.

Figure 7:
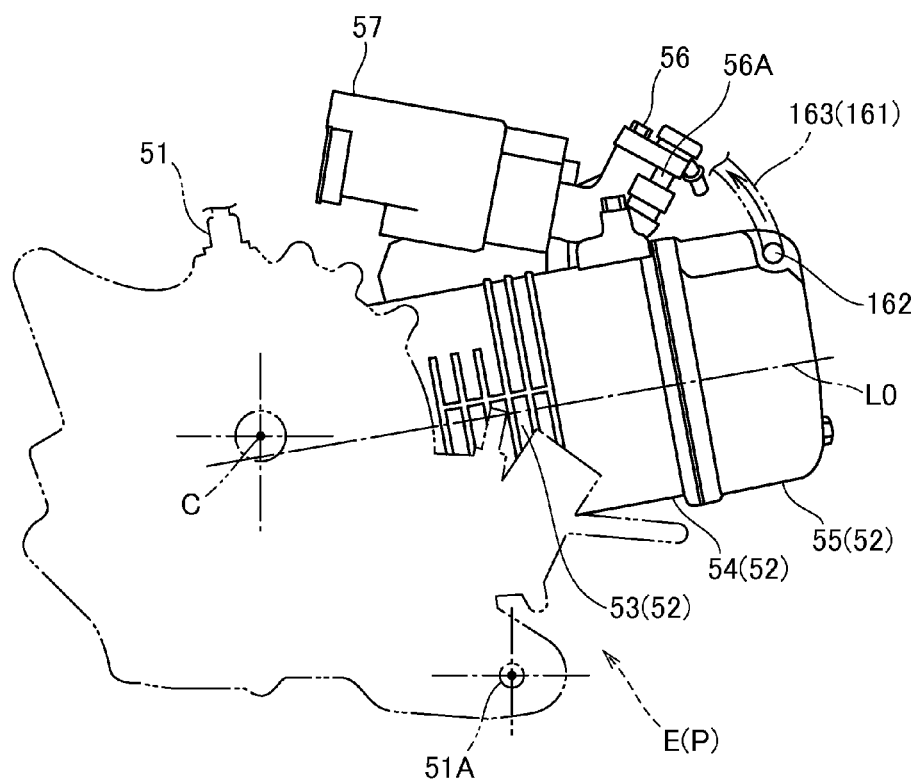
FIG. 7 is a diagram showing a blow-by gas passage together with the surrounding construction thereof.

The vaporized fuel blended in the oil in the crankcase 51 is transmitted to the engine intake system through a blow-by gas reducing device 161. Here, FIG. 7 is a diagram showing a blow-by gas passage of the blow-by gas reducing device 161 together with the surrounding construction. In FIG. 7, the engine E is shown from the right side of the vehicle body.

An opening portion 162 intercommunicating with the inside of the engine E (containing the inside of the crankcase) is provided to the front upper portion (the head cover 55) of the cylinder portion 52 of the engine E. One end of a return hose 163 constituting the blow-by gas passage is connected to the opening portion 162, and the other end of the return hose 163 is connected to a side surface of the connecting tube 57 at the opposite side to the vaporized fuel passage (the second pipe 112) (the left side surface in this construction).

Figure 8:
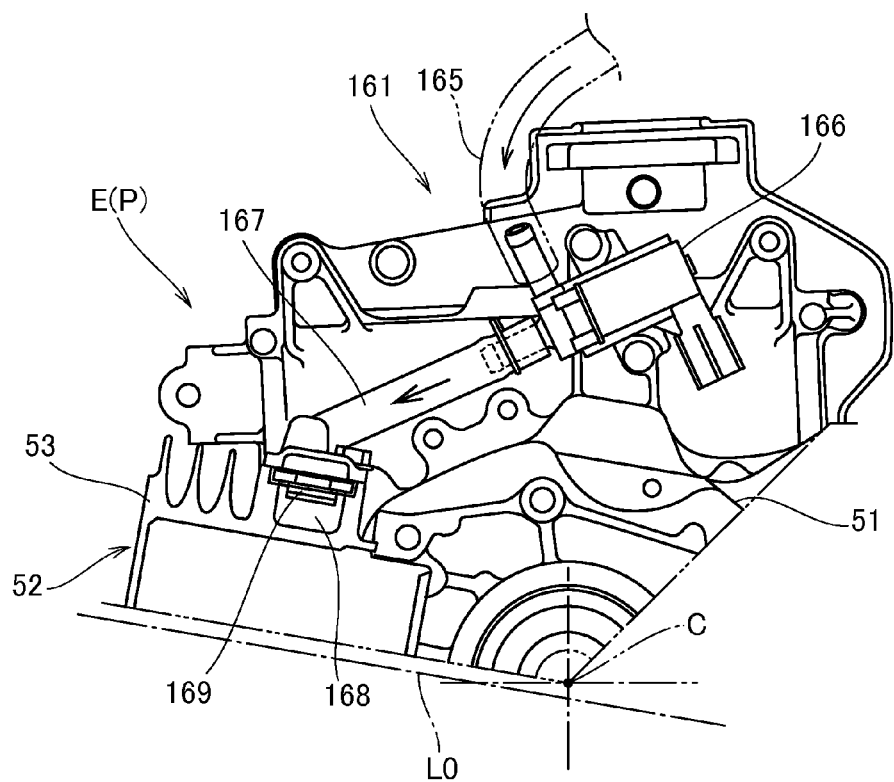
FIG. 8 is a diagram showing a part of a secondary air supply device.

FIG. 8 is a diagram showing a part of the blow-by gas reducing device 161, and is a longitudinally-sectional view of the cylinder portion 52 of the engine E. As shown in FIG. 8, the blow-by gas reducing device 161 has a supply hose 165 for supplying air from the air cleaner unit 58 into the crankcase 51. One end of the supply hose 165 is connected to the air cleaner unit 58 (see FIG. 5), and the other end thereof is joined to the entrance of a control valve unit (see FIG. 8) 166 provided at the upper side of the cylinder portion 52 of the engine E. The exit of the control valve unit 166 is joined to the cylinder portion 52 (the cylinder block 53 in this construction) through the supply hose 167, and intercommunicates with an opening portion 168 provided to the cylinder portion 52. This opening portion 168 intercommunicates with a cam chain chamber (not shown) in the cylinder portion 52, so that it intercommunicates with a valve operating chamber in the cylinder portion 52 and the inside of the crankcase 51. A lead valve (check valve) 169 for feeding air from the air cleaner unit 58 into the crankcase 51 by using pressure variation in the crankcase 51 is provided to the opening portion 168.

The control valve unit 166 has a solenoid valve for opening/closing an air passage from the air cleaner unit 58 to the crankcase 51 (a passage containing the supply hoses 165, 167). When the control valve unit 166 is controlled to an open state by a control unit (not shown), the air passage from the air cleaner unit 58 to the crankcase 51 is opened. Therefore, air is fed from the air cleaner unit 58 into the crankcase 51, and the vaporized fuel blended in the oil can be fed from the head cover 55 through the return hose 163 into the connecting tube 57A together with air-fuel mixture, etc. which intrude from the gap between the piston and the cylinder into the crankcase 51, so that the vaporized fuel can be used for combustion in the engine E through the throttle body 57.

Furthermore, in the control valve unit 166, when the solenoid valve is controlled to a close state, the air passage from the air cleaner unit 58 to the crankcase 51 is closed.

As described above, the vaporized fuel blended in the oil is fed from the head cover 55 through the return hose 163 to the connecting tube 57 together with the air-fuel mixture, etc. which intrude from the gap between the piston and the cylinder into the crankcase 51, and can be used for combustion in the engine E through the throttle body 57. Accordingly, the structure that the vaporized fuel is not discharged to the outside (canister-less evaporation system) can be constructed without using any canister for temporarily adsorbing the vaporized fuel.

Next, a fuel supply system from the fuel tank 35 to the throttle body 57 will be described.

As shown in FIG. 2, the fuel pump 38 is secured to the fuel tank 35, and a fuel hose 39 as a fuel pipe extends from the upper side of the fuel pump 38. The fuel hose 39 is curved to one end side in the vehicle width direction in plan view, and then curved to the other end side in the vehicle width direction, so that the fuel hose 39 is bent in S-shape, thereby forming an S-shaped pipe portion 39S. Thereafter, the fuel hose 39 is joined to an injector in the neighborhood of the throttle body 57 provided at the upper side of the engine E. Accordingly, fuel from the fuel pump 38 is passed through the S-shaped pipe portion 39S and supplied to the injector 56A.

In this case, the S-shaped pipe portion 39S of the fuel hose 39 and the S-shaped pipe portion 111S of the vaporized fuel passage 110 are formed bilaterally symmetrically, and thus the overlap between both the S-shaped pipe portions 39S and 111S in plan view can be minimized. Therefore, the fuel hose 39 and the vaporized fuel passage 110 can be easily laid in a narrow space between the fuel tank 35 and the engine E. In FIG. 5, reference numeral 170 represents a secondary air hose for feeding air from the air cleaner unit 58 to the exhaust port of the engine E.

As described above, the vehicle 1 has the part layout that the engine E is disposed below the seat 12 and the fuel tank 35 is disposed below the footrest portion 44 in front of the engine E. Therefore, the space (the space surrounded by the footrest portion 44, the fuel tank 35, the power unit P, the storage box 26 and the vehicle body frame 2) is formed behind the footrest portion 44. In this construction, the vaporized fuel control device 100, the return hose 163 constituting the blow-by gas passage of the blow-by gas reducing device 161 and a vacuum tube 172 constituting the air passage of the secondary air supply device 171 are arranged by using this space. Therefore, the respective parts can be arranged while the parts are adapted to the part layout.

In this construction, the first pipe 111 and the second pipe 112 constituting the vaporized fuel passage 110 are arranged so that the uppermost portion X is provided at some position of the first pipe 111 and the second pipe 112 which connect the fuel tank 35 and the engine E. The uppermost portion X is disposed to be higher than the fuel tank 35, the engine E and the footrest portion 44, so that the uppermost portion X is disposed to be higher than the fuel upper limit level of the fuel tank 35, the oil upper limit level in the engine E and the footrest portion 44. According to this construction, even when the vehicle 1 is swung, the situation that the liquid fuel in the fuel tank 35 flows into the engine E or the situation that the oil in the engine E flows into the fuel tank 35 can be prevented with a simple construction.

In this case, since the uppermost portion X of the Vaporized fuel passage 110 is set at a higher position than the footrest portion 44, the situation that fuel or oil flows in can be effectively prevented with keeping rider's comfortability by keeping the footrest portion 44 at a low position.

Furthermore, in this construction, the uppermost portion X of the vaporized fuel passage 110 is disposed at the rear side of the vehicle body as compared with the footrest portion 44. Therefore, the vaporized fuel passage 110 of the mount type pipe can be formed by using the space which is vacant behind the footrest portion 44 while the footrest portion 44 is kept at a low position.

Still furthermore, the first check valve 135 for stopping flow from the engine E to the fuel tank 35 is provided at some position of the vaporized fuel passage 110, and the first check valve 135 is disposed at the rear side of the vehicle body as compared with the footrest portion 44. Therefore, the situation that the oil in the engine E flows into the fuel tank 35 can be surely prevented, and also the space behind the footrest portion 44 can be used with keeping the footrest portion 44 at a low position. The first check valve 135 is disposed in the vaporized fuel passage 110 to be nearer to the engine E side than the uppermost portion X of the vaporized fuel passage 110. Therefore, liquid (fuel, oil or the like) stopped by the first check valve 135 can be made to flow to the engine E side.

The second pipe 112 constituting the vaporized fuel passage 110 is disposed along the upper surface of the engine E. Therefore, when the vaporized fuel is condensed in the second pipe 112, the condensed fuel can be positively vaporized by using heat of the engine. In addition, the second pipe 112 slopes rearwards and downwards along the upper surface of the engine E (see FIG. 4). Therefore, the fuel condensed in the second pipe 112 can be made to more easily flow to the engine E, and also oil can be made to easily return to the engine E even when the oil flows from the engine E into the second pipe 112.

Furthermore, the vaporized fuel passage 110 is disposed so as to have the S-shaped pipe portion 111S which is bent in S-shape in the right-and-left vehicle width direction and located behind the footrest portion 44 in the neighborhood of the fuel tank 35 and at a position lower than the uppermost portion X. Therefore, the S-shaped pipe portion 111S can be disposed by using the space behind the footrest portion 44 with keeping the footrest portion 44 at a low position, and even when the vehicle 1 is tilted in the vehicle width direction and thus liquid fuel in the fuel tank 35 flows into the S-shaped pipe portion 111S, the liquid fuel can be suppressed from flowing to the uppermost portion X by the S-shaped pipe portion 111S. In this case, the S-shaped pipe portion 111S makes it hard for the liquid fuel to flow to the uppermost portion X, so that the gas-liquid separation structure at the fuel tank 35 side can be simplified.

Furthermore, this vehicle 1 has the third pipe 113 constituting the air supply passage 150 for supplying air into the fuel tank 35, and the third pipe 113 has the second check valve 137 for stopping the flow from the fuel tank 35 to the atmosphere side, so that the internal pressure of the fuel tank 35 can be prevented from becoming excessively negative pressure.

Still furthermore, since the air supply passage 150 is connected to some position of the vaporized fuel passage 110, a part of the vaporized fuel passage 110 (the first pipe 111) can be shared with the air supply passage 150. Therefore, the number of parts can be reduced, and the space required for the layout of these passages can be reduced.

Still furthermore, the third pipe 113 is connected to the vaporized fuel passage 110 through the joint part 120 provided in the neighborhood of the uppermost portion X of the vaporized fuel passage 110, so that oil and fuel can be suppressed from being trapped at the connection portion.

The third pipe 113 is installed so as to be upwardly sloped from the connection portion thereof which is connected to the vaporized fuel passage 110 through the joint part 120, and also the second check valve 137 is disposed in the upwardly sloped pipe. Therefore, even when fuel intrudes from the second check valve 137 of the third pipe 113 to the vaporized fuel passage 110 side, the fuel can be returned to the vaporized fuel passage 110 side.

<Second Embodiment>

Figure 9:
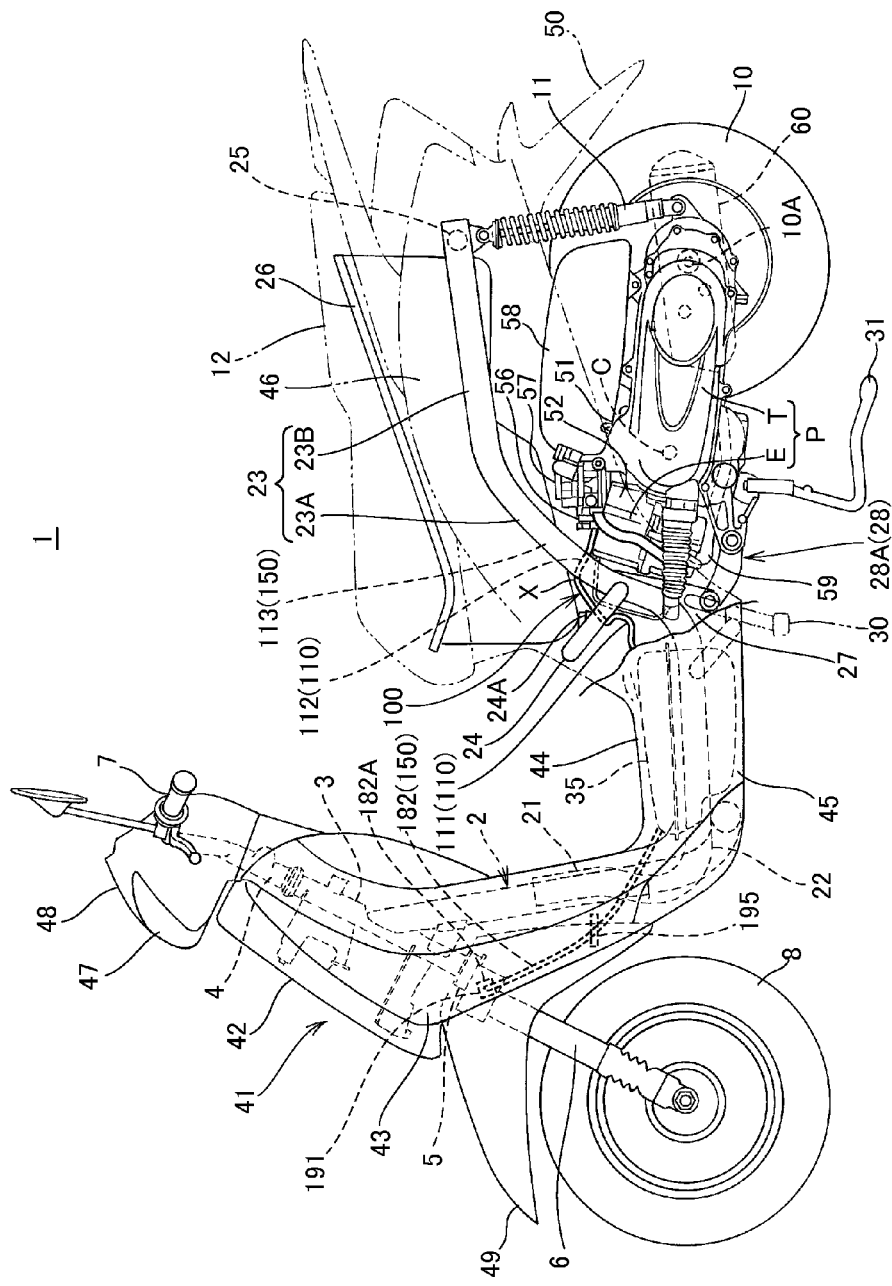
FIG. 9 is a side view of a two-wheeled motor vehicle in which an evaporated fuel control device according to a second embodiment of the present invention is mounted.
Figure 10:
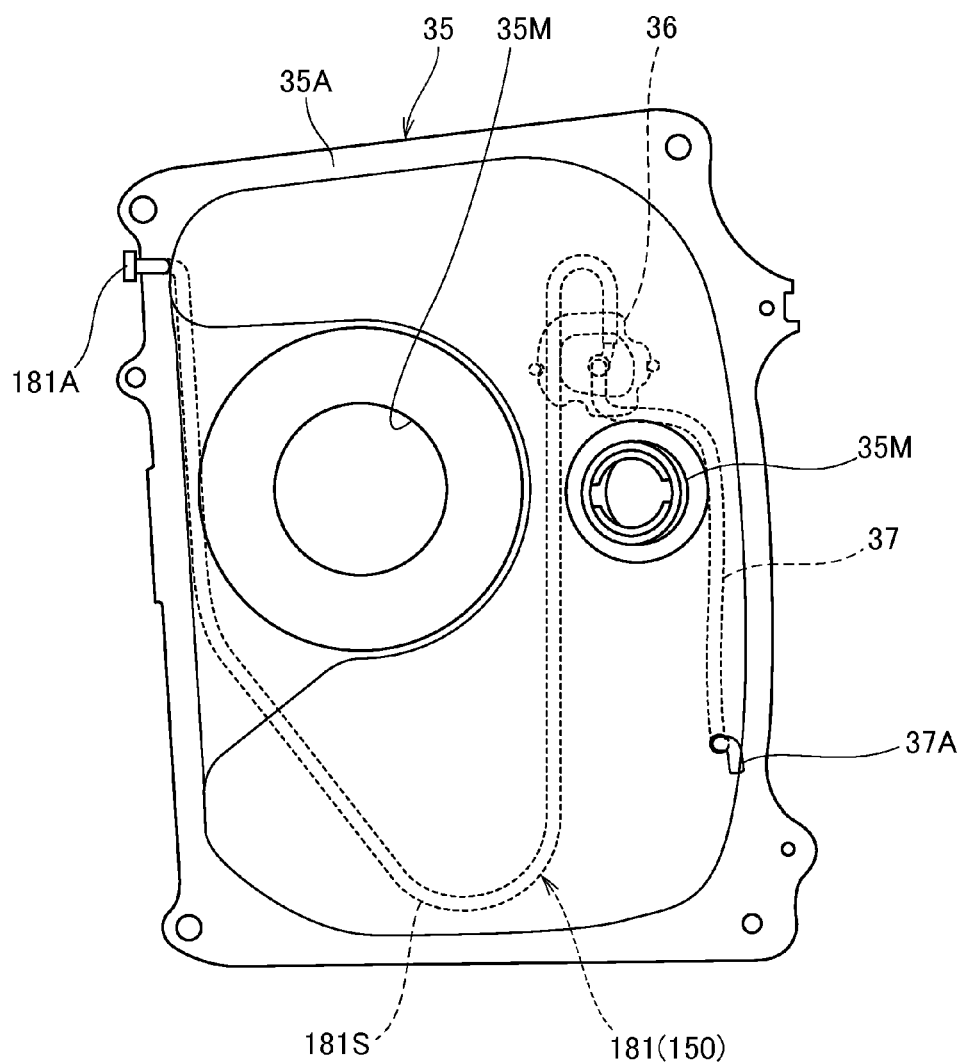
FIG. 10 is a diagram showing a fuel tank together with the surrounding construction thereof.
Figure 11:
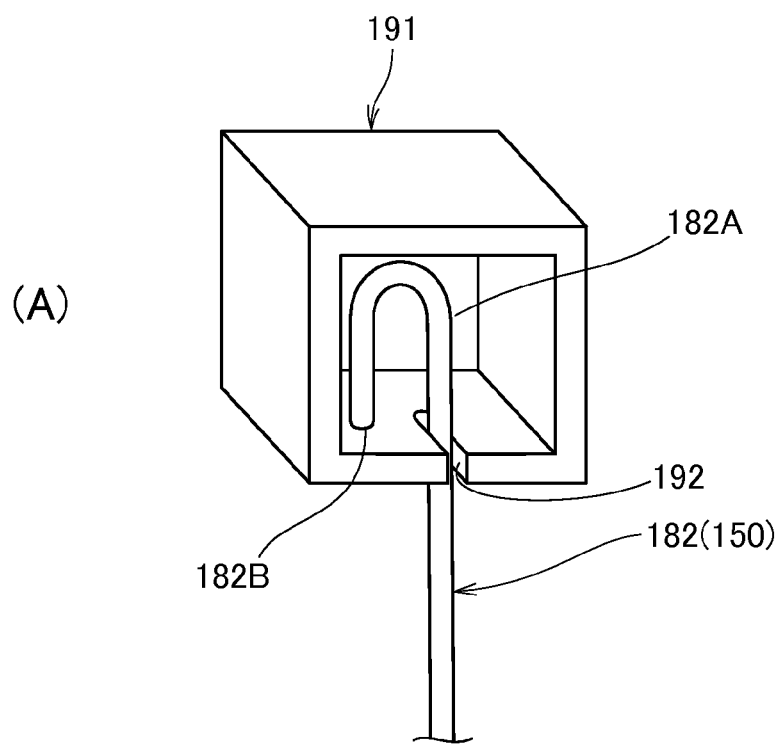
FIG. 11(A) is a diagram showing an upper end portion of a tank exterior pipe together with the surrounding construction thereof.
FIG. 11(B) is a diagram showing a holding member of the tank exterior pipe.
Figure 11:
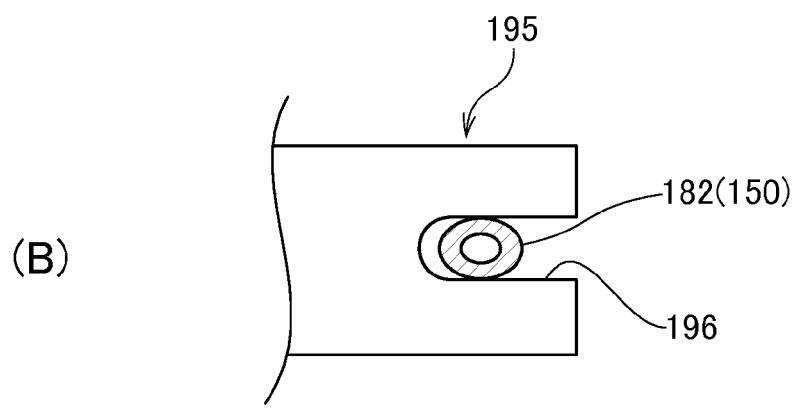

FIGS. 9 to 11 show a second embodiment.

In the second embodiment, the air supply passage 150 for supplying air into the fuel tank 35 is disposed in the leg shield 43.

Specifically, as shown in FIG. 10, an in-tank pipe 181 which is formed of metal or resin (containing rubber) and constitutes the air supply passage 150 at the inside of the tank 35 is provided in the fuel tank 35, and one end of the in-tank pipe 181 is connected to a gas-liquid separator 36, disposed so as to have an S-shaped pipe portion 181S which is bent in S-shape from that position in the right-and-left vehicle width direction, and then projects upwardly from the front side of the upper case 35A of the fuel tank 35. One end of an out-of-tank pipe 182 constituting the air supply passage 150 at the outside of the tank 35 is joined to this projecting portion 181A. The out-of-tank pipe 182 is formed of a pipe having flexibility such as a rubber hose or the like, and as shown in FIG. 9, it is held so as to extend frontwards and upwards from the projecting portion 181A and further extend upwardly along the inner surface of the leg shield 43 and so that the upper end portion 182A thereof is located at the neighborhood of the lower end of the head pipe 3 located at the upper side of the front wheel 8.

In this case, as shown in FIG. 11 (A), the upper end portion 182A of the out-of-tank pipe 182 is disposed in an enclosure portion 191 which is formed integrally with the leg shield 43 when the leg shield 43 is molded, and the upper end portion 182A is bent in the enclosure portion 191 so that the tip opening 182B thereof is oriented downwards. This enclosure portion 191 has a rectangular frame shape which projects inwards from the inner surface of the leg shield 43 in the vehicle width direction, and the out-of-tank pipe 182 is passed through a cut-out portion 192 formed in the bottom plate of the enclosure portion 191 and pinched by the cut-out portion 192. Accordingly, the upper end portion 182A of the out-of-tank pipe 18 is held in the enclosure portion 191.

As described above, the enclosure portion 191 encloses the upper end portion 182A of the out-of-tank pipe 182, and the out-of-tank pipe 182 is opened downwardly, whereby invasion of rain water, dust or the like into the out-of-tank pipe 182 can be prevented.

Furthermore, the leg shield 43 is provided with a holding member 195 for holding the out-of-tank pipe 182 at a position lower than the enclosure portion 191. The holding member 195 is formed integrally when the leg shield 43 is molded, and has a cut-out portion 196 for pinching the out-of-tank pipe 182 between the fuel tank 35 and the enclosure portion 191 as shown in FIG. 11 (B). Accordingly, the out-of-tank pipe 182 can be arranged along the inner surface of the leg shield 43.

As described above, when the air supply passage 150 is disposed in the leg shield 43 located in front of the footrest portion 44, in the part layout that the engine E is disposed below the seat 12 and the fuel tank 35 is disposed below the footrest portion 44 in front of the engine E as in the case of this vehicle 1, the air supply passage 150 can be easily disposed at a position higher than the fuel tank 35 with keeping the footrest portion 44 at a low position. Accordingly, the air supply passage 150 can be provided at a place to which rain water, dust or the like hardly invades. Furthermore, the vacant space in the leg shield 43 is used, and thus it is unnecessary to provide a space separately. Accordingly, the air supply passage 150, etc. can be arranged while adapted to the layout of the vehicle 1.

The case where the S-shaped pipe portion 181S is provided to the in-tank pipe 181 has been described. However, the embodiment is not limited to this style, and the out-of-tank pipe 182 may be bent in S-shape in the right and left vehicle width direction in the leg shield 43 to provide an S-shaped pipe portion at the outside of the fuel tank 35.

The above-described embodiment is an embodiment of the present invention, and any modification and application may be made without departing from the subject matter of the present invention. For example, when the air-cooled type engine E is provided with a shroud which covers the cylinder portion 52 and circulates air in the cylinder portion 52, the support of the vaporized fuel passage (second pipe 112) on the engine E is performed by the support on the shroud, whereby the vaporized fuel passage can be supported at a relatively stable temperature.

Furthermore, in a case of a water-cooled type engine like the above-described embodiment, the support of the vaporized fuel passage (second pipe 112) on the engine E is performed by the support in the neighborhood of a water jacket, whereby the vaporized fuel passage can be supported at a relatively stable temperature.

Still furthermore, the support of the vaporized fuel passage (second pipe 112) on the engine E may be performed by the support in the neighborhood of a cam chain chamber or an oil passage which is provided to the cylinder block 53 or the cylinder head 54 of the cylinder portion 52, whereby the vaporized fuel passage can be supported at a relatively stable temperature.

Still furthermore, in the above embodiment, the boss (the boss of the engine hanger link) to which the link member (the engine hanger link) 28A is joined is located below the cylinder portion 52. However, the boss may be disposed above or behind the cylinder portion 52.

The pair of clamp members 121 and 122 which hold the first pipe 111 at the first cross member 24 is not necessarily provided on the lower surface of the first cross member 24, but may be provided on the upper surface of the first cross member 24. That is, the first pipe 111 may be passed along the upper surface of the first cross member 24.

Furthermore, in the above embodiment, PCV (Positive Crankcase Ventilation) for positively ventilating the inside of the crankcase 51 by the supply hoses 165 and 167, the return hose 163 and the lead valve 169 is used as the blow-by gas reducing device. However, a blow-by hose (return hose 163) through which the crankcase 51 and the engine intake system are connected to each other may be merely provided.

Still furthermore, in the above embodiment, the present invention is applied to the vaporized fuel control device of the scooter type vehicle shown in FIG. 1. However, the present invention is not limited to this type, and the present invention may be applied to the vaporized fuel control device of another straddle type vehicle. The straddle type vehicle contains all-around vehicles over which riders straddles for riding, and it contains a three-wheeled vehicle and a four-wheeled vehicle not only a two-wheeled motor vehicle which are classified into ATV (All Terrain Vehicle).

DESCRIPTION OF REFERENCE NUMERALS

1 two-wheeled motor vehicle (straddle type vehicle)
2 vehicle body frame
12 seat
35 fuel tank
39S, 111S, 181S S-shaped pipe portion
43 leg shield
44 footrest portion
110 out-of-tank pipe (vaporized fuel passage)
111 first pipe (vaporized fuel passage, air supply passage)
112 second pipe (vaporized fuel passage)
113 third pipe (air supply passage)
120 joint part
135 first check valve
137 second check valve
150 air supply passage
181 in-tank pipe (air supply passage)
182 out-of-tank pipe (air supply passage)
E engine
P power unit
T power transmission device
X uppermost portion

The invention claimed is:

1. A straddle type vehicle having a vaporized fuel control device, the straddle type vehicle comprising:
   a seat on which a driver sits,
   an engine disposed below the seat,
   a footrest portion which is disposed forward of the engine and on which the driver puts driver's feet,
   a fuel tank disposed below the footrest portion, and
   a vaporized fuel passage that is connected to the fuel tank at one end of the vaporized fuel passage and connected to the engine at an other end of the vaporized fuel passage to discharge vaporized fuel in the fuel tank into oil in the engine, wherein
   the vaporized fuel passage is disposed so as to have an uppermost portion thereof disposed between the fuel tank and the engine,
   the uppermost portion of the vaporized fuel passage is disposed at a position higher than a fuel upper limit level of the fuel tank, an oil upper limit level in the engine and the footrest portion,
   a check valve for stopping flow of fluid from the engine to the fuel tank is disposed in the vaporized fuel passage, and
   the check valve is disposed in the vaporized fuel passage rearward of the footrest portion.

2. A straddle type vehicle having a vaporized fuel control device, the straddle type vehicle comprising:
   a seat on which a driver sits,
   an engine disposed below the seat,
   a footrest portion which is disposed forward of the engine and on which the driver puts driver's feet,
   a fuel tank disposed below the footrest portion, and
   a vaporized fuel passage that is connected to the fuel tank at one end of the vaporized fuel passage and connected to the engine at an other end of the vaporized fuel passage to discharge vaporized fuel in the fuel tank into oil in the engine, wherein
   the vaporized fuel passage is disposed so as to have an uppermost portion thereof disposed between the fuel tank and the engine,
   the uppermost portion of the vaporized fuel passage is disposed at a position higher than a fuel upper limit level of the fuel tank, an oil upper limit level in the engine and the footrest portion,
   a check valve for stopping flow of fluid from the engine to the fuel tank is disposed in the vaporized fuel passage, and
   the check valve is disposed in the vaporized fuel passage to be nearer to the engine than the uppermost portion of the vaporized fuel passage.

3. A straddle type vehicle having a vaporized fuel control device, the straddle type vehicle comprising:
- a seat on which a driver sits,
- an engine disposed below the seat,
- a footrest portion which is disposed forward of the engine and on which the driver puts driver's feet,
- a fuel tank disposed below the footrest portion, and
- a vaporized fuel passage that is connected to the fuel tank at one end of the vaporized fuel passage and connected to the engine at an other end of the vaporized fuel passage to discharge vaporized fuel in the fuel tank into oil in the engine, wherein
- the vaporized fuel passage is disposed so as to have an uppermost portion thereof disposed between the fuel tank and the engine,
- the uppermost portion of the vaporized fuel passage is disposed at a position higher than a fuel upper limit level of the fuel tank, an oil upper limit level in the engine and the footrest portion, and
- the straddle type vehicle has an air supply passage for supplying air into the fuel tank, and the air supply passage has a check valve for stopping flow of fluid from the fuel tank from being discharged into the atmosphere.

4. The straddle type vehicle according to claim 3, wherein the air supply passage is connected to the vaporized fuel passage.

5. The straddle type vehicle according to claim 4, wherein the air supply passage is connected to the vaporized fuel passage near the uppermost portion of the vaporized fuel passage.

6. The straddle type vehicle according to claim 4, wherein the air supply passage is upwardly sloped from a connection portion connected to the vaporized fuel passage, and the check valve is disposed in the upwardly sloped air supply passage.

7. The straddle type vehicle according to claim 3, wherein the straddle type vehicle has a leg shield in front of the footrest portion, and the air supply passage is disposed in the leg shield.

* * * * *